United States Patent
Knudson et al.

(10) Patent No.: US 7,322,038 B2
(45) Date of Patent: *Jan. 22, 2008

(54) PROGRAM GUIDE SYSTEM FOR RECORDING TELEVISION PROGRAMS

(75) Inventors: Edward B. Knudson, Littleton, CO (US); Michael D. Ellis, Boulder, CO (US); William L. Thomas, Bixby, OK (US); Bruce L. Davis, Lake Oswego, OR (US)

(73) Assignee: United Video Properties, Inc., Los Angeles, CA (US)

( * ) Notice: Subject to any disclaimer, the term of this patent is extended or adjusted under 35 U.S.C. 154(b) by 1048 days.

This patent is subject to a terminal disclaimer.

(21) Appl. No.: 10/627,379

(22) Filed: Jul. 24, 2003

(65) Prior Publication Data

US 2004/0019903 A1 Jan. 29, 2004

Related U.S. Application Data

(60) Continuation of application No. 10/202,280, filed on Jul. 22, 2002, now Pat. No. 6,748,596, which is a continuation of application No. 09/654,856, filed on Sep. 5, 2000, now Pat. No. 6,473,559, which is a division of application No. 08/924,239, filed on Sep. 5, 1997, now Pat. No. 6,141,488.

(51) Int. Cl.
*H04N 7/16* (2006.01)
*H04N 5/445* (2006.01)
*H04N 5/91* (2006.01)
*G06F 3/00* (2006.01)
*G06F 13/00* (2006.01)

(52) U.S. Cl. ............................ 725/25; 725/30; 725/39; 725/58; 386/83

(58) Field of Classification Search ................ 725/25, 725/27, 28, 30, 37, 38, 39, 58; 386/83
See application file for complete search history.

(56) References Cited

U.S. PATENT DOCUMENTS

| | | | |
|---|---|---|---|
| 4,520,404 A * | 5/1985 | Von Kohorn | 725/28 |
| 4,706,121 A | 11/1987 | Young | 358/142 |
| 4,908,707 A | 3/1990 | Kinghorn | 358/147 |
| 4,945,563 A | 7/1990 | Horton et al. | 380/5 |
| 4,977,455 A | 12/1990 | Young | 358/142 |
| 5,038,211 A | 8/1991 | Hallenbeck | 358/142 |
| 5,047,867 A | 9/1991 | Strubbe et al. | 358/335 |
| 5,151,789 A | 9/1992 | Young | 358/194.1 |
| 5,210,611 A | 5/1993 | Yee et al. | 358/191.1 |
| 5,253,066 A | 10/1993 | Vogel | 358/188 |
| 5,323,234 A | 6/1994 | Kawasaki | 348/6 |
| 5,353,121 A | 10/1994 | Young et al. | 348/563 |

(Continued)

FOREIGN PATENT DOCUMENTS

GB  2 227 622  8/1990

(Continued)

*Primary Examiner*—Vincent F. Boccio
(74) *Attorney, Agent, or Firm*—Ropes & Gray LLP

(57) ABSTRACT

An interactive program guide system is provided. The system facilitates recording of programs selected from the program guide. The system handles the recording and viewing of pay programs, parentally-controlled programs, consecutive programs on different television channels, and programs with and without copy protection. Programs may be recorded using combination television videocassette recorder (TV/VCR) units.

20 Claims, 11 Drawing Sheets

U.S. PATENT DOCUMENTS

| | | | |
|---|---|---|---|
| 5,416,508 A | 5/1995 | Sakuma et al. | 348/3 |
| 5,459,522 A | 10/1995 | Pint | 348/478 |
| 5,485,219 A | 1/1996 | Woo | 348/460 |
| 5,539,822 A | 7/1996 | Lett | 380/20 |
| 5,568,272 A | 10/1996 | Levine | 386/48 |
| 5,585,838 A | 12/1996 | Lawler et al. | 348/13 |
| 5,585,866 A * | 12/1996 | Miller et al. | 725/43 |
| 5,619,274 A | 4/1997 | Roop et al. | 348/461 |
| 5,629,733 A | 5/1997 | Youman et al. | 725/53 |
| 5,631,995 A | 5/1997 | Weissensteiner et al. | 386/1 |
| 5,657,414 A | 8/1997 | Lett et al. | 386/35 |
| 5,692,214 A | 11/1997 | Levine | |
| 5,694,381 A | 12/1997 | Sako | 369/58 |
| 5,808,608 A | 9/1998 | Young et al. | 345/327 |
| 5,825,968 A | 10/1998 | Nishigaki et al. | |
| 5,850,218 A | 12/1998 | LaJoie et al. | 725/45 |
| 5,940,572 A | 8/1999 | Balaban et al. | 386/46 |
| 5,953,417 A | 9/1999 | Quan | |
| 5,969,748 A | 10/1999 | Casement et al. | 725/27 |
| 6,057,874 A | 5/2000 | Michaud | |
| 6,078,348 A | 6/2000 | Klosterman et al. | |
| 6,157,413 A | 12/2000 | Hanafee et al. | 348/563 |
| 6,195,501 B1 * | 2/2001 | Perry et al. | 725/58 |
| 6,381,747 B1 | 4/2002 | Wonfor et al. | |
| 6,473,559 B1 * | 10/2002 | Knudson et al. | 725/39 |
| 6,650,824 B1 | 11/2003 | Horlander et al. | |
| 6,665,869 B1 | 12/2003 | Ellis et al. | |
| 6,674,958 B2 * | 1/2004 | Wehmeyer et al. | 725/58 |
| 6,748,596 B2 * | 6/2004 | Knudson et al. | 725/39 |
| 6,772,433 B1 * | 8/2004 | LaJoie et al. | 725/58 |
| 2004/0073927 A1 * | 4/2004 | Knudson et al. | 725/58 |

FOREIGN PATENT DOCUMENTS

| | | |
|---|---|---|
| WO | WO 93/23957 | 11/1993 |
| WO | WO 97/13368 | 4/1997 |

* cited by examiner

| THU 28 | 9:00 PM | 9:30 | 10:00 |
|---|---|---|---|
| 4 WNBC | SEINFELD | 3RD ROCK FROM THE SUN | ER |
| 5 WNYW | MARTIN | NEW YORK UNDERCOVER: THE LAST HURRAH | |
| 6 NICK | HAPPY DAYS | HAPPY DAYS | HAPPY DAYS |
| 7 WABC | HIGH INCIDENT | TURNING POINT | |

62

PROGRAM GUIDE SYSTEM FOR RECORDING TELEVISION PROGRAMS

This is a continuation of pending prior application Ser. No. 10/202,280, filed Jul. 22, 2002 now U.S. Pat. No. 6,748,596, which is a continuation of patent application Ser. No. 09/654,856, filed Sep. 5, 2000, now U.S. Pat. No. 6,473,559, which is a divisional of patent application Ser. No. 08/924,239, filed Sep. 5, 1997, now U.S. Pat. No. 6,141,488. All of these prior patent applications are hereby incorporated by reference herein in their entireties.

BACKGROUND OF THE INVENTION

This invention relates to recording television programs, and more particularly, to systems for recording television programs selected from an interactive television program guide.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides allow users to access television program listings in different display formats. For example, a user may desire to view a grid of program listings organized in a channel-ordered list. Alternatively, the user may desire to view program listings organized by time, by theme (movies, sports, etc.), or by title (i.e., alphabetically ordered).

A user may select a program for viewing or recording from the program guide. For example, the user may place a highlight region on top of a desired program listing and press a "record" button on a remote control. Pay programs may be ordered by placing the highlight region on a pay program listing and pressing an "order" button. Some program guides allow parents to block certain television programs based on criteria such as ratings information.

There are sometimes difficulties associated with using these program guide features. For example, previously known interactive program guide systems have generated infrared commands at the scheduled broadcast time of a program selected for recording that instruct a videocassette recorder to turn on prior to recording the selected program. Although such an approach is satisfactory for operating many standard videocassette recorders, it is incompatible with combined TV/VCR units, because the television and videocassette recorder portions of combined TV/VCR units typically share a common power circuit. The commands issued to turn on the videocassette recorder prior to recording generally turn off TV/VCR units entirely if the user is using the television portion of the TV/VCR at the scheduled time for recording. If the TV/VCR is turned off in this way, the TV/VCR will not record the program selected for recording. Moreover, turning off the TV/VCR unit while the viewer is watching television is annoying to the user.

Another difficulty associated with previous program guide systems relates to recording consecutive programs on different channels. Previously known program guide systems have recorded short buffer segments just before and after the scheduled broadcast time of each selected program. For example, a one-minute buffer segment may be recorded before a program is scheduled to begin and a three-minute buffer segment may be recorded following the scheduled completion of the program. Recording such buffer segments ensures that the program is recorded in its entirety even if there is a slight discrepancy between the set-top box clock and the broadcast time of the program. However, if the two consecutive programs are recorded on different channels, the beginning of the second program will generally be lost because the system will not change to the proper channel for the second program until the trailing buffer segment for the first program has ended.

Another difficulty associated with previously known program guide systems relates to recording parentally-controlled programs. Parental control allows parents to lock certain programs or groups of programs based on blocking criteria such as a title, channel, ratings information, content, etc. When a program is locked, the parent creates a parental control personal identification number (PIN). When it is time for the locked program to be broadcast, the system asks the parent to enter the parental control PIN. The system blocks the display of the locked program unless the correct parental control PIN is provided. However, if the system is attempting to display a given program because that program was selected for recording from the program guide, the user may not be present when the system asks the user to enter the PIN. As a result, the selected program will not be unlocked prior to recording. What is needed is a way in which to allow locked programs to be recorded without requiring that the user be present when the program is recorded.

Previously known program guide systems have also allowed programs to be selected for recording without checking to see if such programs are pay programs. If the user of such a system fails to purchase the program prior to recording, the program will not be properly descrambled during recording.

Another difficulty associated with previously known program guide systems relates to recording copy-protected programs. Such systems allow users to select copy-protected programs for recording without warning the users that the selected programs are copy protected and therefore not be useable if recorded.

Another difficulty associated with previously known program guide systems relates to recording and viewing pay programs that are offered at a higher price without copy protection than when offered with copy protection. In such systems it has generally been difficult for the user to coordinate the purchase process, the selection of whether the program will be copy protected, and the scheduling of recording and viewing.

It is therefore an object of the present invention to provide an interactive television program guide with improved program recording and viewing capabilities.

SUMMARY OF THE INVENTION

This and other objects of the invention are accomplished in accordance with the principles of the present invention by providing an interactive program guide system in which programs may be selected for recording from the program guide. The program guide may be implemented using a set-top box or other suitable equipment. Programs are recorded using a videocassette recorder or other suitable video recording device. At the scheduled broadcast time of the program selected for recording, the program guide system tunes the set-top box to the television channel of the selected program and directs the videocassette recorder to begin recording the program.

The system is compatible with combination television videocassette recorder (TV/VCR) units. If recording is to be performed using a TV/VCR, the system displays a message informing the user when recording is about to begin. The message asks the user whether the user desires to continue with the recording of the selected program. If the user indicates a desire not to continue recording, recording is cancelled. If the user indicates a desire to continue with recording, the system tunes to the appropriate channel and directs the videocassette recorder portion of the TV/VCR to begin recording. If the user does not respond, it is assumed that the TV/VCR is off, so the system transmits a suitable command to turn on the TV/VCR before directing the videocassette recorder portion of the TV/VCR to begin recording.

Consecutive programs on different channels can be recorded without losing any portion of either program by eliminating some of the buffer segments recorded with previously known systems.

Locked programs may be recorded using several techniques. One technique for handling locked programs involves determining whether a program selected from a program guide has previously been locked. If the selected program has been locked, the system requests that a parent enter a parental control personal identification number (PIN). Only if the PIN is correct is the selected program unlocked and recorded at the scheduled broadcast time of the selected program.

Another technique for handling locked programs involves displaying a message that informs a user whenever a program previously selected for recording becomes locked. The message provides the user with an opportunity to decide whether to cancel or to retain the recording selection. If the recording selection is retained, the system unlocks the selected program and records the selected program at the scheduled broadcast time for the program.

Another technique for handling locked programs involves determining whether a parental control PIN has been created with the system whenever a program is selected for recording from the program guide. If a PIN has been created, the PIN must be entered before the program will be recorded successfully.

The system allows pay programs to be recorded by determining whether programs selected for recording from the program guide are pay programs when they are selected. If a selected program is a pay program, the system asks the user to purchase the program (if the user has not already purchased the program). If the program is purchased, the system descrambles and records the selected program at the scheduled broadcast time of the program.

The system also handles copy protected programs. With one arrangement, the system determines whether a program selected for recording is copy protected. If the program is not copy protected, the system records the program at the scheduled broadcast time of the program. If the program is copy protected, the system displays a message informing the user that the selected program may not be recorded.

With another arrangement, the system allows the user to select a pay program for recording or for viewing. If the program is selected for recording, the system offers the program at a price suitable for a program without copy protection. At the scheduled broadcast time of the program, the system provides the program to the videocassette recorder without copy protection and directs the videocassette recorder to record the selected program. If the program is selected for viewing, the system offers the program at a price suitable for a program with copy protection. At the scheduled broadcast time the system provides the program for viewing with copy protection.

Further features of the invention, its nature and various advantages will be more apparent from the accompanying drawings and the following detailed description of the preferred embodiments.

BRIEF DESCRIPTION OF THE DRAWINGS

FIG. 2 is a schematic block diagram of an illustrative program guide display screen in accordance with the present invention.

DETAILED DESCRIPTION OF THE PREFERRED EMBODIMENTS

Figure 1:
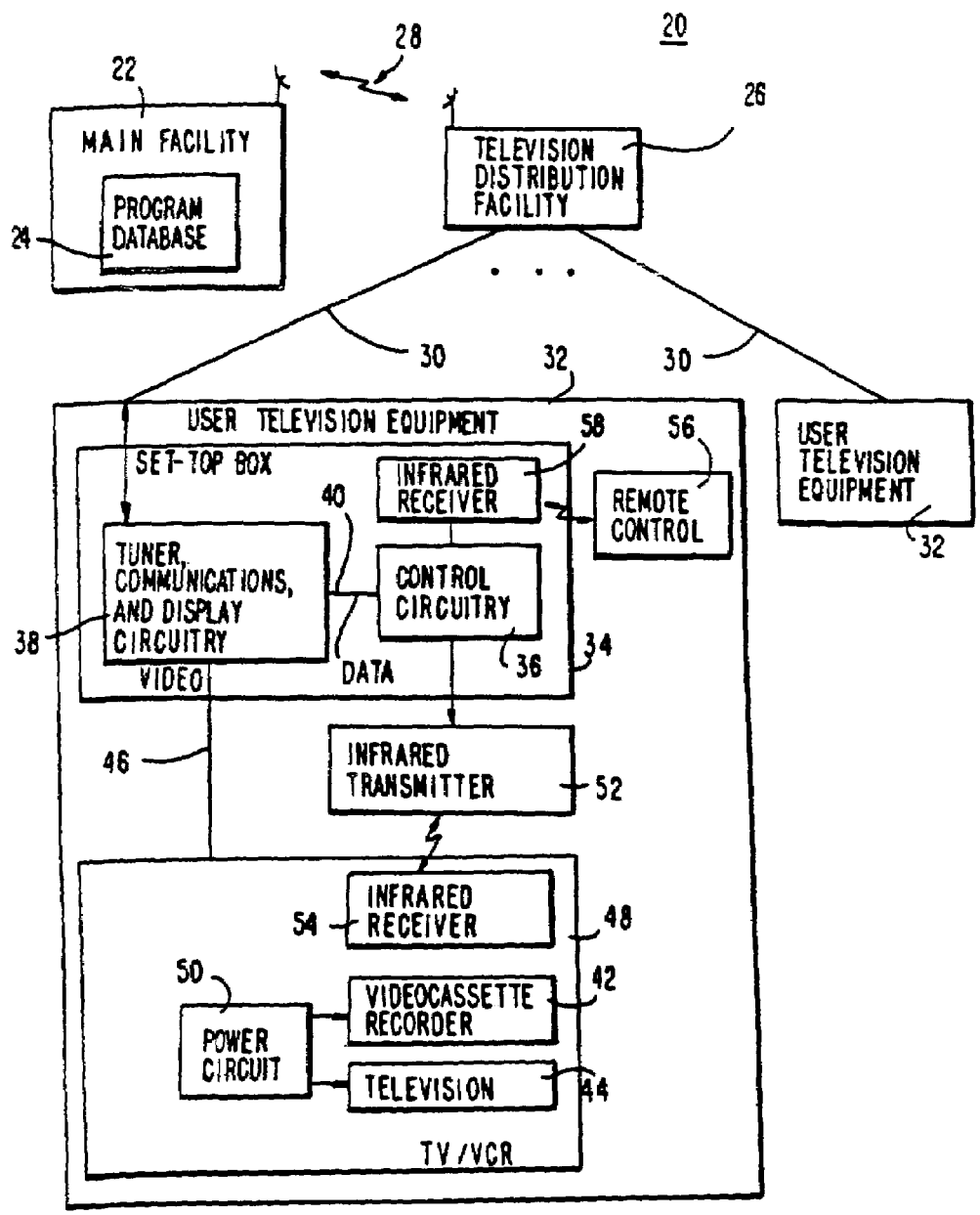
FIG. 1 is a schematic block diagram of a system in accordance with the present invention.

An illustrative system 20 that supports an interactive television program guide in accordance with the present invention is shown in FIG. 1. Main facility 22 provides data from program guide database 24 to television distribution facility 26 via communications link 28. Link 28 may be a satellite link, a telephone network link, a cable or fiber optic link, a microwave link, a combination such links, or any other suitable communications path. Television distribution facility 26 may be a cable system headend, a broadcast distribution facility, a satellite television distribution facility, or other suitable distribution facility.

The data transmitted by main facility 22 to television distribution facility 26 includes television program guide data such as program times, channels, titles, ratings, descriptions and other program listings information, and pay program pricing information, copy protection information, etc. If desired, some data may be provided using data sources at facilities other than main facility 22.

Television distribution facility 26 distributes the program guide data to multiple users via communications paths 30. Program guide data may be distributed periodically (e.g., once each week). Each user has user television equipment 32 for displaying television program listings and providing other interactive television program guide features. Many features of the interactive television program guide are provided by executing instructions with a microprocessor or similar control circuitry within user equipment 32. Communications paths 30 preferably have sufficient bandwidth to allow television distribution facility 26 to distribute television programming and other video information to user equipment 32 in addition to program guide data. If desired, program guide data may be distributed by a distribution facility that is separate from television distribution facility 26 using communications paths that are separate from communications paths 30.

Certain program guide functions may require user equipment 32 to transmit data to distribution facility 26 over communications paths 30. If desired, such return data may be transmitted over separate communications paths (not shown).

User equipment 32 preferably contains a set-top box 34 or other suitable equipment with which an interactive program guide is implemented. Set-top box 34 contains control circuitry 36, which is preferably microprocessor-based circuitry for executing instructions to control the operation of the interactive program guide. Set-top box 34 also has tuner, communications, and display circuitry 38.

Circuitry 38 contains communications circuitry for extracting program data from video and data signals provided to set-top box 34 over communications link 30. This extracted program data is provided to control circuitry 36 via path 40. The communications circuitry in circuitry 38 allows control circuitry 36 to transmit signals to television distribution facility 26.

Circuitry 38 also contains display circuitry that allows a program grid and other interactive program guide information generated by control circuitry 36 to be displayed on a television such as television 44.

Circuitry 38 contains tuner circuitry for selecting a desired television channel from among the television signals provide to set-top box 34 via communications path 30. The signal for the television channel is provided to videocassette recorder 42 and television 44 via path 46. Videocassette recorder 42 and television 44 which may be provided in the form of a separate television (TV) and videocassette recorder (VCR) (not shown) or as a single integrated TV/VCR unit 48 powered by a common power circuit 50, as shown in FIG. 1.

Another function of circuitry 38 is to block parentally-locked programs (e.g., by disrupting the audio and video signals of such locked programs). Circuitry 38 may also be used to enable or disable viewing of pay programs depending on whether such programs have been purchase by the viewer. Typically, authorization for the descrambling of scrambled pay programs is provided to set-top box 34 from television distribution facility 26 after a program purchase request transmitted to television distribution facility 26 by set-top box 34 has been processed. If desired, circuitry 38 may have the capability to handle copy-protected programs, so that, for example, circuitry 38 may remove copy protection from a given program.

During normal television viewing, the user tunes set-top box 34 to a desired television channel. The signal for that television channel is then provided on path 46 either as a radio-frequency (RF) signal on a predefined channel (e.g., channel 3 or 4) or as a demodulated video signal. The video signal on path 46 is received by TV/VCR 48, so that the user may record programs. Program recording and other features may be controlled by the interactive program guide on set-top box 34 using infrared transmitter 52 to provide commands to infrared receiver 54 in TV/VCR 48. Infrared receiver 54 also accepts commands from remote control 56. Remote control 56 may be used to control set-top box 34 by transmitting commands to infrared receiver 58. If videocassette recorder 42 and television 44 are provided as separate units, each unit may have its own infrared receiver. Commands from infrared transmitter 52 used to direct the functions of videocassette recorder 42 may then be provided directly to the infrared receiver of videocassette recorder 42.

Remote control 56 may have cursor keys, an "enter," "select," or "ok" button, a "guide" button, a "record" button, an "order" button, a "lock" button and various other control buttons. When the user presses the "guide" button, set-top box 34 invokes the interactive program guide and displays an appropriate screen of program listings on television 44.

A typical program guide display is a grid of television program listings such as grid 60 of FIG. 2. Each row of grid 60 contains program listings information for a different television channel. Columns of grid 60 are associated with different scheduled broadcast times for the programs (e.g., 9:00 PM, 9:30 PM, and 10:00 PM). The program listings format of grid 60 is illustrative only. Any other suitable type of program listings display format may be used. Moreover, grid 60 is only one display screen of many display screens that are generally presented to the user during use of the program guide. Various menus and program listings screens are generated to provide program guide features related to setting up the program guide system, searching or sorting program listings, viewing information for selected programs, handling the purchase of pay programming, informing the viewer of copy protection, prompting the viewer for parental-control information, etc.

In a program listings grid such as grid 60 of FIG. 2, a highlight region such as highlight region 62 may be used to define the current position of the user in the grid. The user positions highlight region 62 using the cursors on remote control 56. If highlight region 62 is positioned on a program that the user desires to record, the user can select that program for recording by pressing the "record" button. If highlight region 62 is positioned on a pay program that the user desires to order, the user can order the program by pressing the "order" button. The user can press the "lock" button to set parental controls (e.g., to prevent a child from viewing inappropriate material). The "enter" button may be used in conjunction with the cursor keys to navigate through program guide menus and to respond to various queries from the program guide. If desired, the functions of the dedicated "enter," "guide," "record," "order," and "lock" buttons and various other control buttons on remote control 56 may be provided in the form of suitable menu options that the user may select using the cursor keys and a button like the "select" or "enter" button. In addition, other dedicated buttons may be provided on remote control 56 if desired.

One aspect of the present invention relates to recording television programs selected from the interactive program guide using single unit TV/VCRs. Combined TV/VCR units are incompatible with previously known program guide systems, because the VCR "on" commands that were typically transmitted by such systems just prior to recording a selected program caused combined TV/VCRs that were on because the user was watching TV to be turned off.

Figure 3:
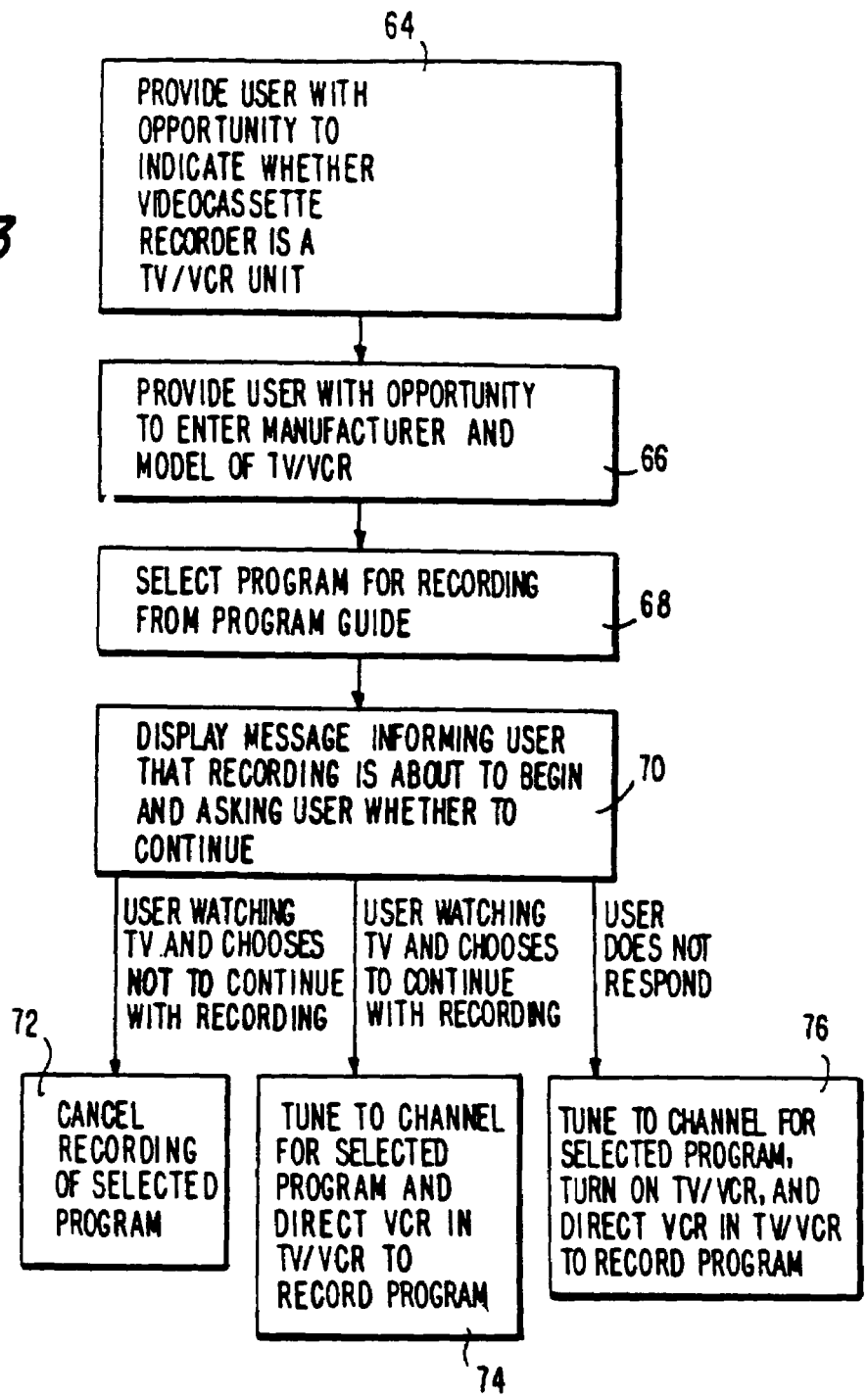
FIG. 3 is a flow chart of illustrative steps involved in recording television programs using a combination TV/VCR unit in accordance with the present invention.

Illustrative steps involved in using the interactive program guide system of the present invention to record programs on TV/VCR units such as TV/VCR 48 are shown in FIG. 3. At step 64, a message is displayed on the user's television that provides the user with an opportunity to indicate whether the videocassette recorder being used is a stand-alone unit or is part of a combined TV/VCR unit. After the user indicates that a combined TV/VCR unit is being used, the user is provided with an opportunity to enter the manufacturer and model of the TV/VCR unit at step 66. Steps 64 and 66 may be performed during the set-up procedures for the interactive program guide system.

At step 68, the user is provided with an opportunity to select a program for recording from the program guide. For example, the user may position highlight region 62 (FIG. 2) on top of a desired program entry in program listings grid 60 (FIG. 2) and press the "record" button on remote control 56 (FIG. 1). Just before the scheduled broadcast time of the selected program, a message is displayed on television 44 (FIG. 1) that informs the user that recording is about to begin (step 70). The message asks whether the user desires to continue with the recording of the selected television program. If the user indicates a desire to discontinue the recording of the program in response to the message of step 70, the recording of the program is cancelled at step 72. If the user indicates a desire to continue with the recording of the program in response to the message of step 70, the recording of the selected program is performed at step 74. Program recording at step 74 involves using control circuitry 36 to direct circuitry 38 to tune to the appropriate channel for recording the selected program and to direct videocassette recorder 42 of TV/VCR unit 48 to begin recording by transmitting a "record" command to infrared receiver 54 of TV/VCR 48 with infrared transmitter 52. When the selected program is over, recording may be terminated by transmitting a "stop" command to videocassette recorder 42.

If the user does not respond to the message of step 70, it is assumed that the user is not present and that the TV/VCR is therefore off. Accordingly, at step 76, control circuitry 36 directs circuitry 38 to tune to the appropriate channel for recording the selected program, directs videocassette recorder 42 of TV/VCR unit 48 to turn on by transmitting a "turn on" command to infrared receiver 54 of TV/VCR 48 with infrared transmitter 52, and directs videocassette recorder 42 of TV/VCR unit 48 to begin recording by transmitting a "record" command to infrared receiver 54 of TV/VCR 48 with infrared transmitter 52. When the selected program is over, recording may be terminated by transmitting "stop" and "off" commands to TV/VCR unit 48.

Figure 4:
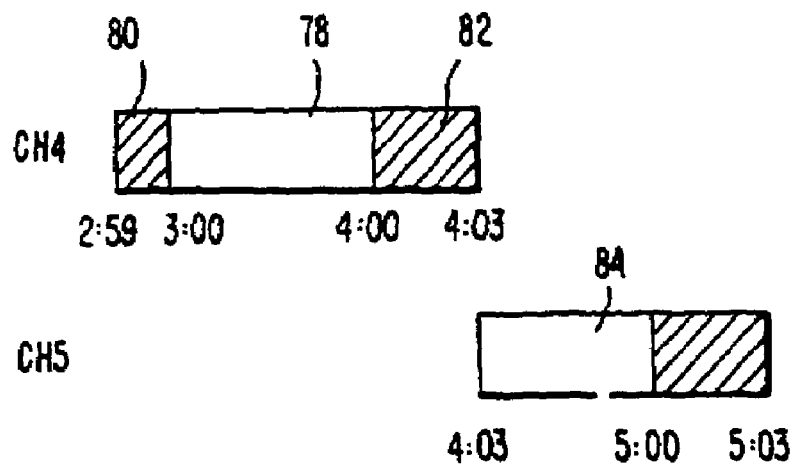
FIG. 4 is a schematic diagram showing how the recording schemes used in previously known program guide systems could result in the loss of a portion of a desired program during recording.

Another aspect of the present invention relates to recording consecutive programs on different channels. Previously known program guide systems have recorded short buffer segments just before and after the scheduled broadcast time of each recorded program. For example, as shown in FIG. 4, a one-minute buffer segment 80 is typically recorded before program 78 is scheduled to begin at 3:00 and a three-minute buffer segment 82 is recorded following the scheduled completion of program 78 at 4:00. Recording buffer segments 80 and 82 in addition to program 78 ensures that program 78 is recorded in its entirety even if there is a slight error in the set-top box clock. However, if a second program 84 is selected for consecutive recording on a different channel (e.g., channel 5 instead of channel 4), the beginning of second program 84 (e.g., from 4:00 to 4:03) will be lost because the system will not change to the proper channel for program 84 until the recording of buffer segment 82 has been completed.

Figure 5:
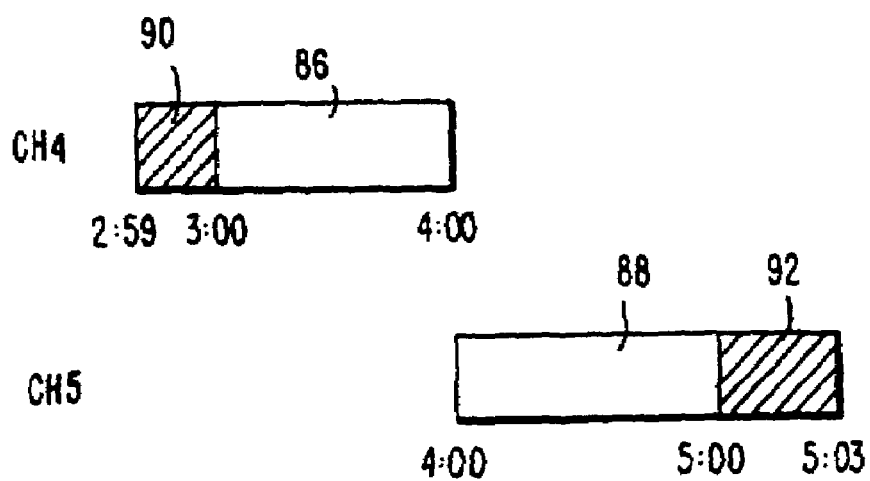
FIG. 5 is a schematic diagram showing how a program guide system in accordance with the present invention eliminates the program loss experienced with the approach shown in FIG. 4.

As shown in FIG. 5, the interactive program guide system of the present invention eliminates the trailing buffer of first program 86 whenever a second program 88 is selected for back-to-back recording on a different channel (e.g., channel 5 rather than channel 4). The other buffer segments, such as leading buffer segment 90 and trailing buffer segment 92, are preferably retained. If another program is selected for recording immediately following program 88, trailing buffer segment 92 may be eliminated. If desired, all buffer segments may be eliminated. Buffer segment lengths other than the illustrative one-minute leading and three-minute trailing buffer segment lengths shown in FIG. 5 may also be used.

Figure 6A:
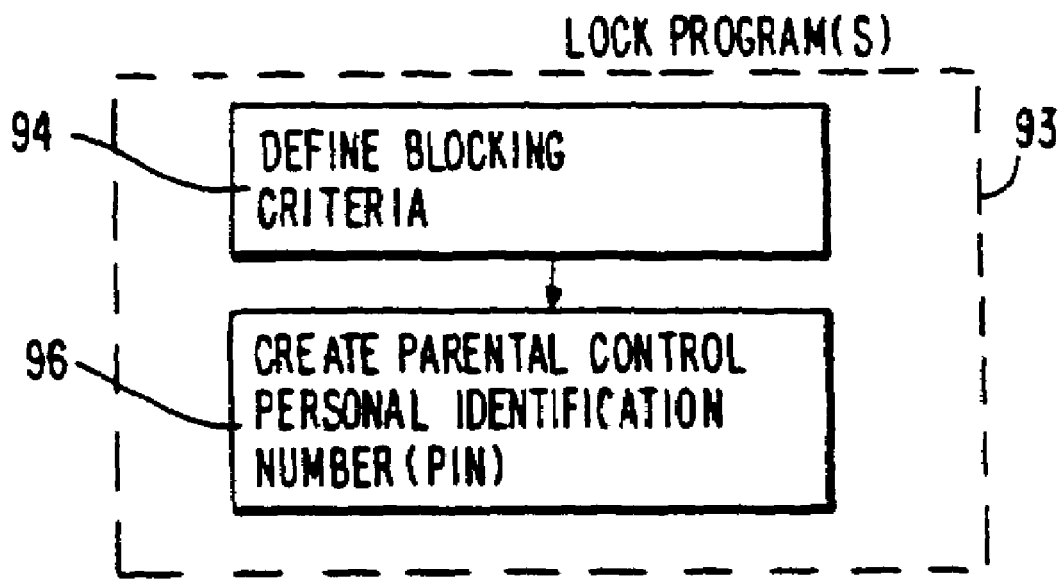
FIG. 6a is a flow chart of illustrative steps involved in defining blocking criteria and creating a parental control personal identification number (PIN) in accordance with the present invention.

Another aspect of the present invention relates to recording programs that may have been locked by a parent to prevent viewing by a child. As shown in FIG. 6a, the interactive program guide system of the present invention allows a parent to lock certain programs at step 93. In particular, the system allows the parent to define blocking criteria at step 94 to selectively lock certain programs (i.e., programs with possibly inappropriate content for children). Step 94 may be performed during a set-up procedure or whenever desired. Programs with specific titles may be blocked. Blocking criteria may also be based on ratings, channel, time period, content (e.g., sex or violence), etc. Program guide data such as titles, ratings, channels, times, content, etc. is provided to set-top box 34 from program database 24 of main facility 22 so that the system can determine which programs should be blocked based on the blocking criteria. Following (or before) entry of the blocking criteria at step 94, the system allows the parent to create a parental control personal identification number (PIN) at step 96.

Figure 6B:
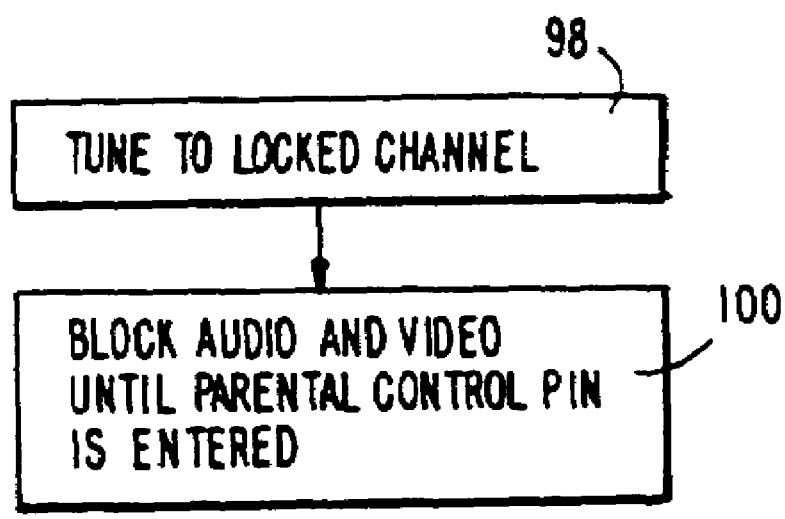
FIG. 6b is a flow chart of illustrative steps involved in blocking the viewing of a television program with parental controls in accordance with the present invention.

When the parent wishes to view a program that has been locked, the parent tunes to the desired channel at step 98 of FIG. 6b. The system blocks the audio and video of the locked program until the parent enters the parental control PIN. A child without the PIN cannot view the locked program.

Figure 7A:
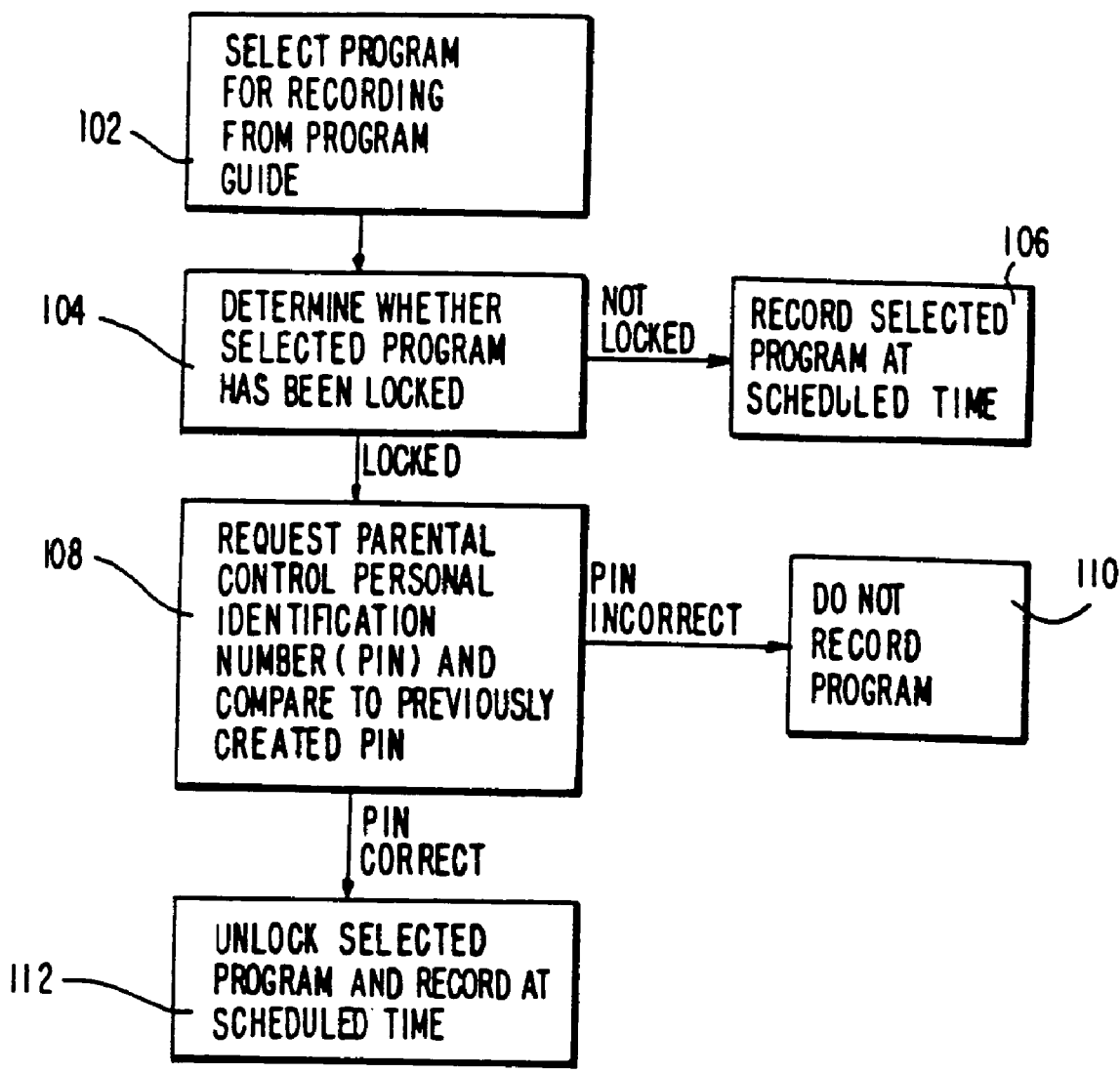
FIGS. 7a, 7b, and 7c are flow charts of illustrative approaches for recording a television program locked with parental controls in accordance with the present invention.

Various techniques may be used by the system to handle the recording of locked programs. One approach is shown in FIG. 7a. At step 102, the system allows the user to select a program for recording from the program guide (e.g., by highlighting the desired program and pressing the "record" button on remote control 56). At step 104, the system determines whether the selected program has been locked. If the selected program has not been locked, the program is recorded at the scheduled broadcast time at step 106 (e.g., by tuning to the desired channel with circuitry 38 and activating videocassette recorder 42 at the appropriate time.) If the selected program has been locked, the system displays a message at step 108 that asks the user to provide the parental control PIN created at step 96 of FIG. 6a. If a correct PIN is not provided, the program is not recorded (step 110). If the correct PIN is provided at step 108, the system unlocks the selected program and records the unlocked program at step 112.

Figure 7B:
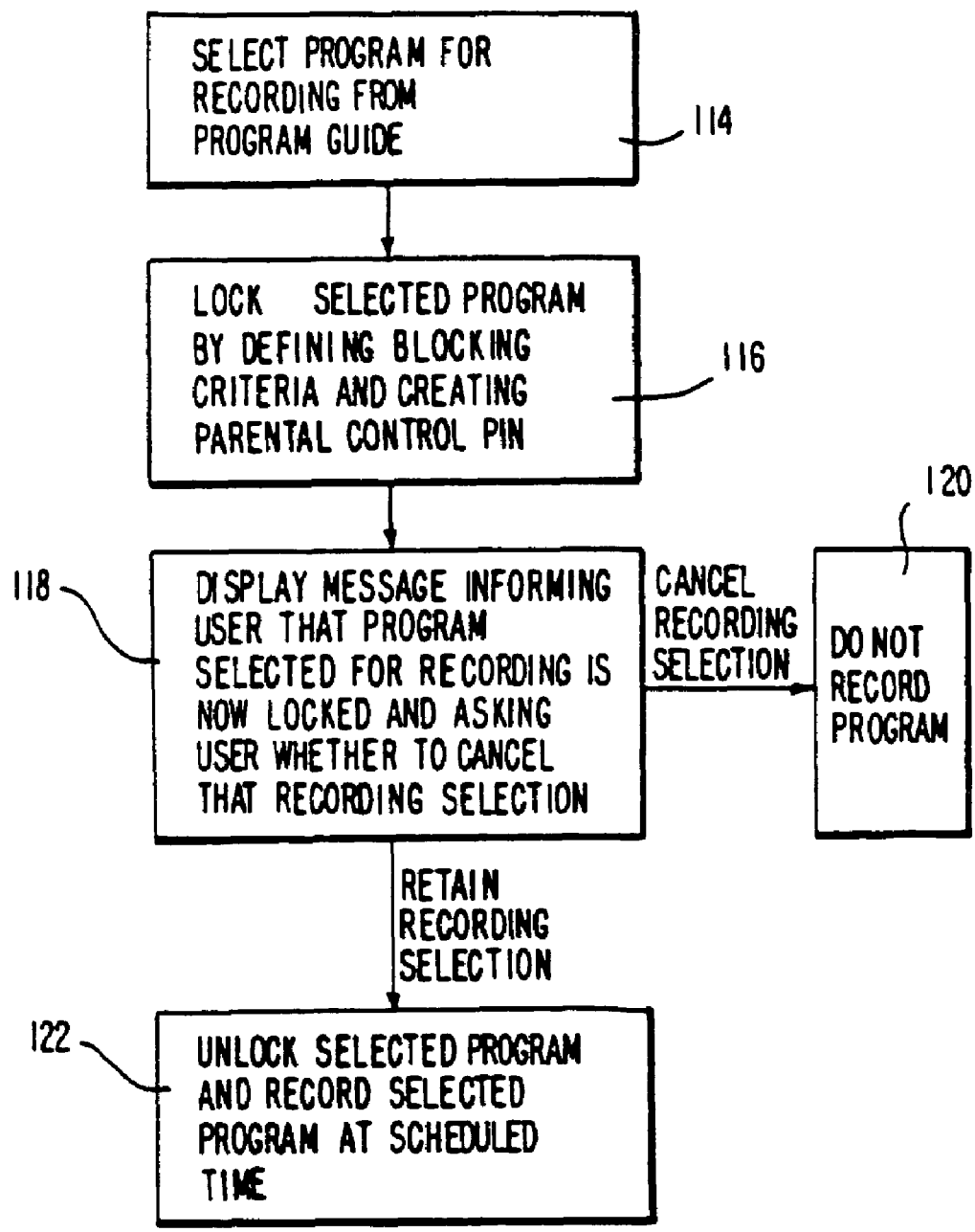

Another approach is shown in FIG. 7b. At step 114, the system allows the user to select a program for recording from the program guide. Later, but before the scheduled broadcast time for the selected program, the user may lock the selected program at step 116. The locking of the selected program at step 116 may be deliberate or inadvertent (e.g., when a user defines blocking criteria at step 94 of FIG. 6a that cause a number of programs including the selected program to become locked). Regardless of whether the locking of the selected program is deliberate or inadvertent, the system detects that the selected program has become locked and displays a corresponding message at step 118. The message informs the user that a program previously selected for recording is now locked. The message also asks the user whether the user desires to cancel the recording of the selected program or whether the recording selection should be retained. If the user indicates that the recording selection should be cancelled, the selected program is not recorded by the system (step 120). If the user indicates that the recording selection should be retained, the system unlocks the selected program and records the selected program at the scheduled broadcast time at step 122.

Figure 7C:
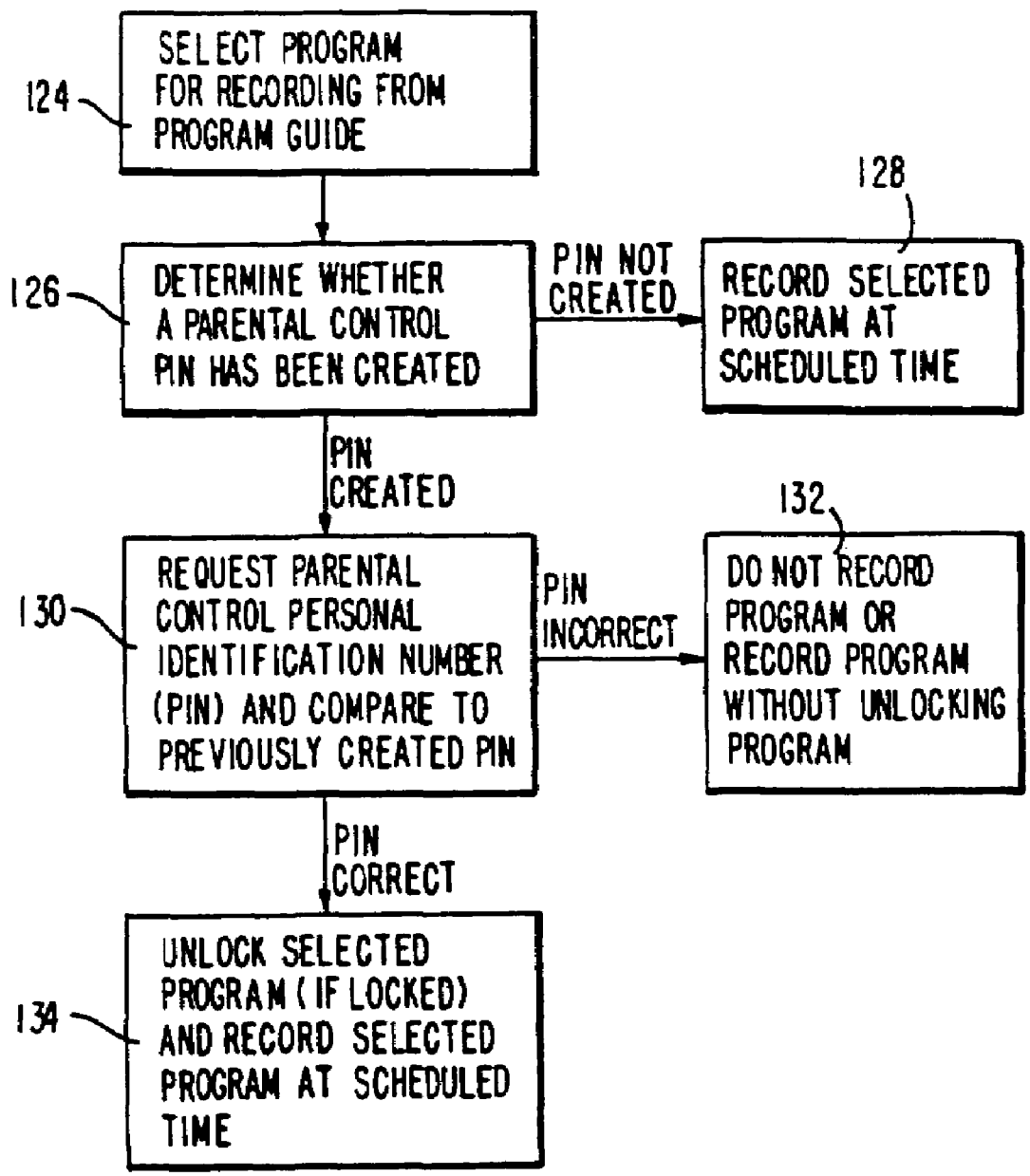

Another approach is shown in FIG. 7c. At step 124, the system allows the user to select a program for recording from the program guide. At step 126, the system determines whether a parental control PIN has been created (i.e., at step 96 of FIG. 6a). If no parental control PIN has been created, no programs are locked, so the system may record the selected program at the scheduled broadcast time at step 128. If a parental control PIN has been created, this indicates that the parent is interested in controlling which programs are viewed by the child. Accordingly, at step 130, the system asks the user to input the parental control PIN. If the PIN is incorrect, the recording of the selected program may either be prevented entirely or may be allowed to proceed but without unlocking the program (step 132). If the correct parental control PIN is provided at step 130, the system unlocks the selected program if it was locked and records the selected program at the scheduled broadcast time at step 134.

The approaches of FIGS. 7a, 7b, 7c allow the system to handle the recording of parentally-locked programs without requiring the user to enter a parental control PIN at a time when the user might not be present.

Another aspect of the present invention relates to recording pay programs. Previously known systems allowed programs to be selected for recording without checking to see if such programs were pay programs. If the user of such a system failed to purchase the program prior to recording, the program would not be descrambled during recording.

Figure 8:
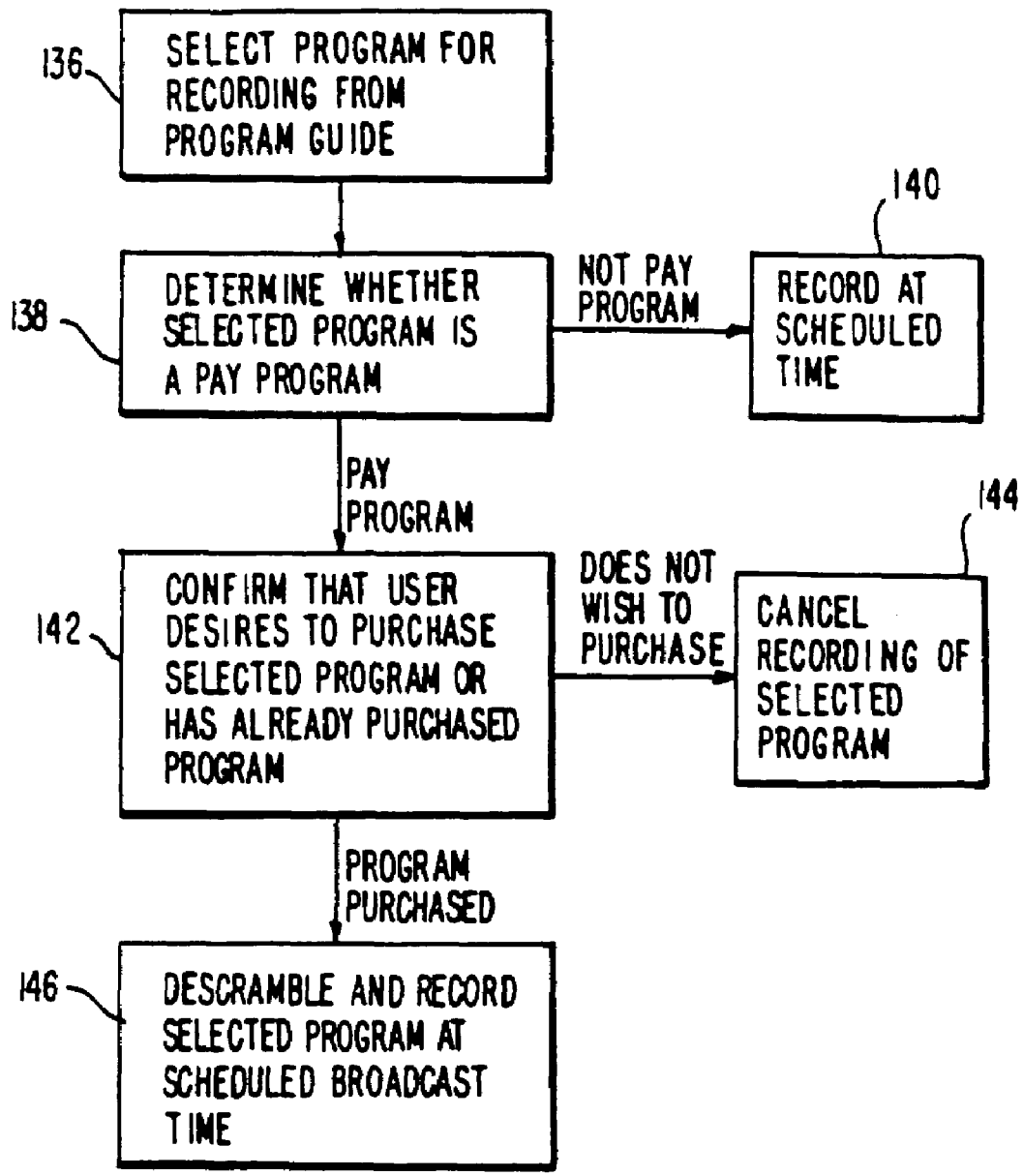
FIG. 8 is a flow chart of illustrative steps involved in recording a pay program in accordance with the present invention.

As shown in FIG. 8, the system of the present invention allows a user to select a program for recording from the program guide at step 136. At step 138, the system determines whether the selected program is a pay program. Program guide data identifying certain program listings as pay programs is provided to set-top box 34 with the other program guide data supplied by database 24 of main facility 22.

If the system determines at step 138 that the selected program is not a pay program, the system records the selected program at the scheduled broadcast time at step 140. If the system determines that the selected program is a pay program, the system either confirms that the user has already purchased the selected program or allows the user to purchase the program at step 142. The user may purchase the program by entering an appropriate predefined personal identification number or using some other suitable technique (e.g. entering "ok" following display of a message asking the user to confirm a purchase). At the appropriate time, set-top box 34 descrambles the desired pay program. If the user indicates a desire not to purchase the program at step 142, the recording of the selected program is cancelled at step 144. If the program is purchased, the system descrambles and records the selected program at the scheduled broadcast time at step 146.

Another aspect of the present invention relates to recording copy-protected programs. Previously known systems have allowed users to select copy-protected programs for recording without warning the users that the selected programs were copy protected and therefore not useable if recorded.

Figure 9:
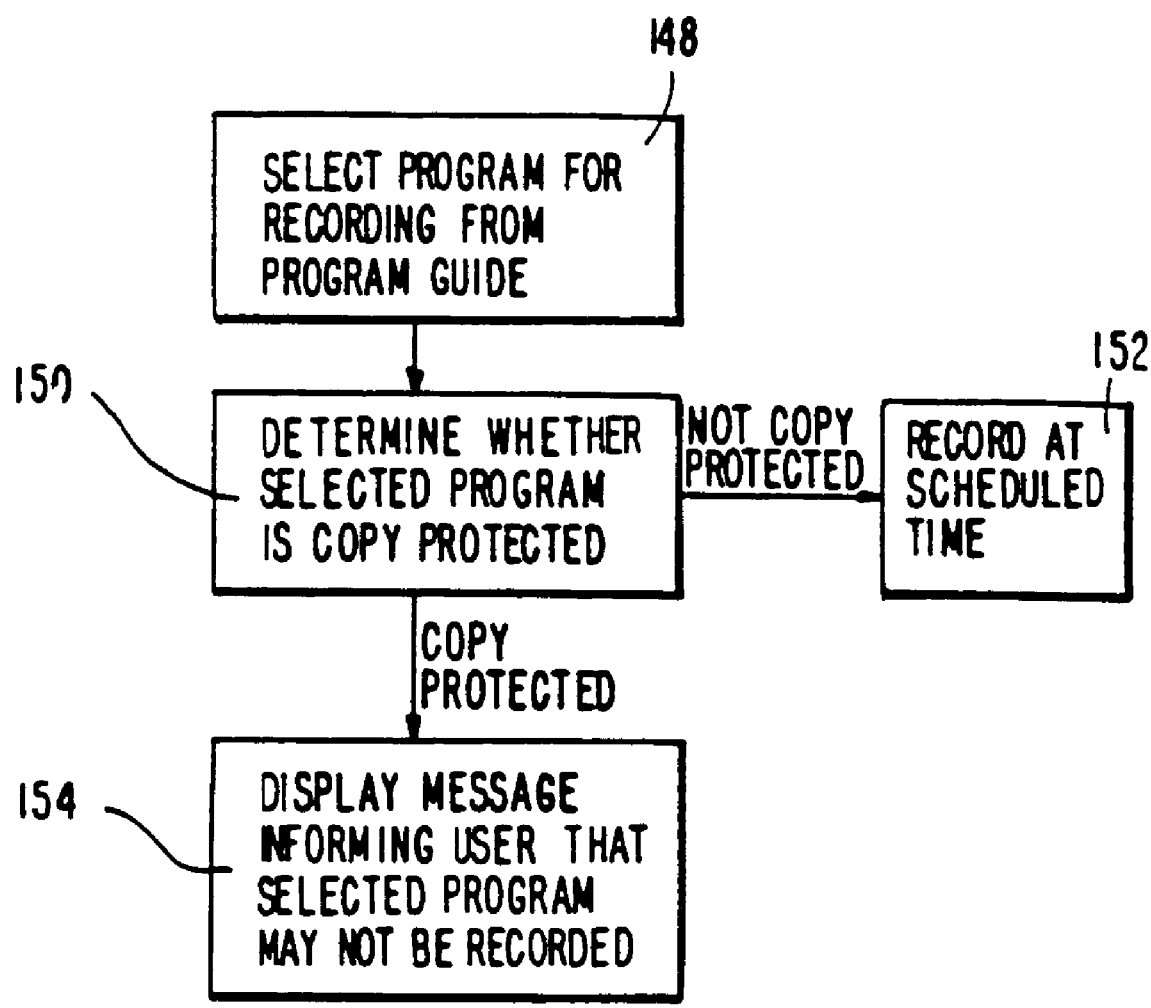
FIG. 9 is a flow chart of illustrative steps involved in recording a copy-protected program in accordance with the present invention.

As shown in FIG. 9, the system of the present invention allows the user to select a program for recording from the program guide at step 148. At step 150, the system determines whether the selected program is copy protected. Program guide data identifying certain program listings as copy protected is provided to set-top box 34 with the other program guide data supplied by database 24 of main facility 22. If the system determines at step 150 that the selected program is not copy protected, the selected program is recorded at the scheduled broadcast time at step 152. If the system determines that the program selected for recording is copy protected, the system displays a message at step 154 informing the user that the selected program may not be recorded.

Figure 10:
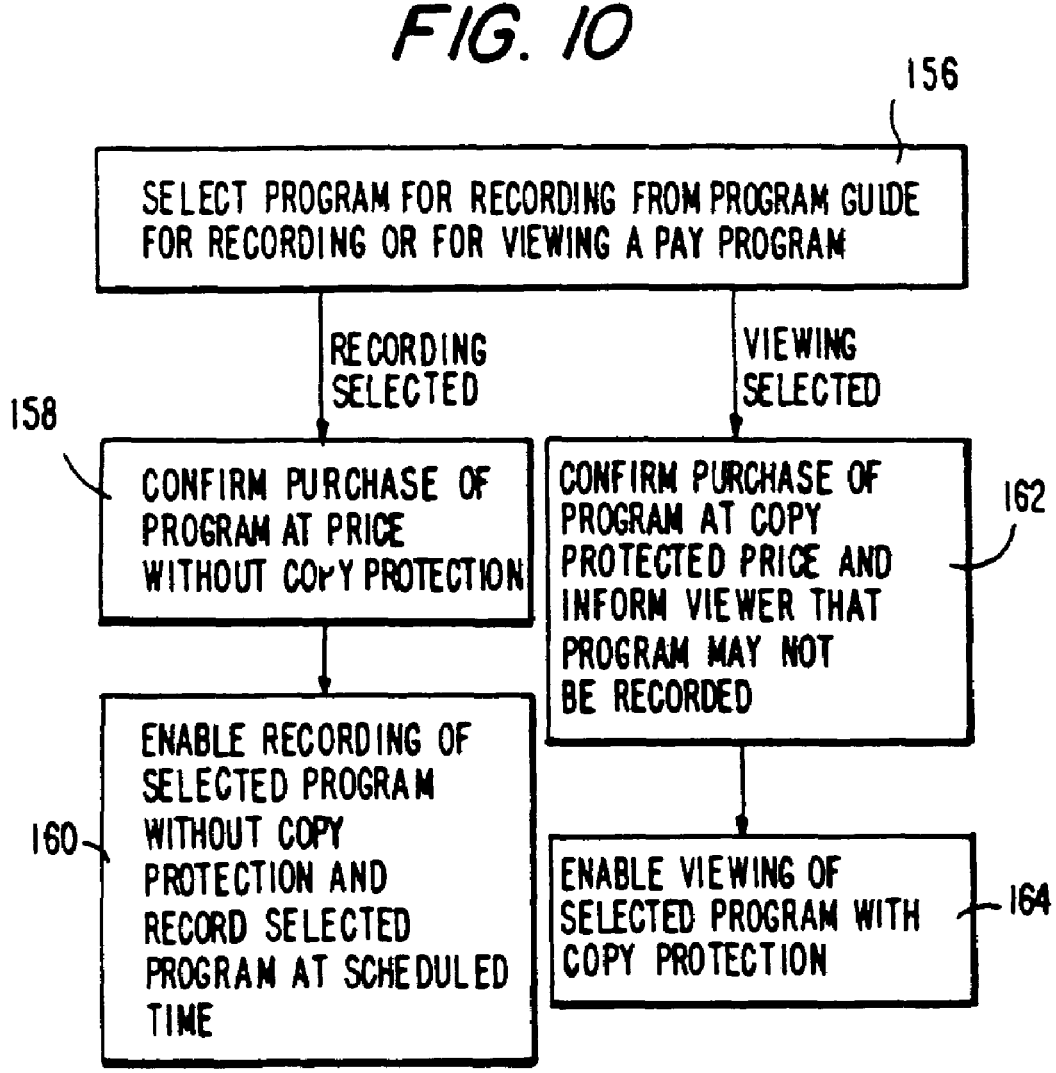
FIG. 10 is a flow chart of illustrative steps involved in recording a pay program without copy protection or viewing a pay program with copy protection in accordance with the present invention.

Another aspect of the invention relates to recording pay programs that are offered at different prices depending on whether the program is copy protected or not. As shown in FIG. 10, at step 156 the system allows the user to select a pay program for viewing only or for recording (and viewing if desired).

If the user opts to record the selected program, the system allows the user to purchase the program at the appropriate price for recording the program without copy protection at step 158. If the user declines to purchase the program during step 158, recording is cancelled. If, however, the user confirms the purchase of the selected program, the order is processed by transmitting the order to television distribution facility 26. At step 160, the system provides the selected program without copy protection and records the selected program.

If at step 156 the user opts to view the program but not to record the program, the system allows the user to purchase the program at a copy-protected price (typically less than the price without copy protection) at step 162. The system also informs the user at step 162 that the program may not be recorded. At step 164, the system provides the program to the user for viewing with copy protection.

If desired, combinations of these various program guide features may be provided. For example, parentally-recorded programs may be recorded on combinations TV/VCR units, pay programs may be recorded back-to-back with other programs, copy-protected programs that are parentally controlled may be recorded, etc.

The foregoing is merely illustrative of the principles of this invention and various modifications can be made by those skilled in the art without departing from the scope and spirit of the invention.

What is claimed is:

1. An interactive program guide system including user equipment with which an interactive television program guide is provided and which includes a video recorder and a television, comprising:
   means for receiving television program guide information for use in the interactive television program guide;
   means for selecting a program for recording from the interactive television program guide;
   means for locking the selected program, wherein when the selected program is locked access to the selected program is blocked;
   means for displaying a message when the selected program becomes locked to ask the user whether to retain the recording selection;

means for receiving a response from the user that indicates whether the user desires to retain the recording selection; and means for unlocking the selected program and directing the video recorder to record the selected program when the response received from the user indicates that the user desires to retain the recording selection.

2. The interactive program guide system defined in claim 1 wherein the means for locking the selected program is performed by using blocking criteria.

3. The interactive program guide system defined in claim 2 wherein the blocking criteria is selected from the group consisting of program titles, ratings, channel numbers, time periods, content, and any combination thereof.

4. A method for using an interactive program guide system using user equipment with which an interactive television program guide is provided and which includes a video recorder and a television, comprising:

receiving television program guide information for use in the interactive television program guide;

selecting a program for recording from the interactive television program guide;

locking the selected program, wherein when the selected program becomes locked, access to the selected program is blocked;

displaying a message when the selected program becomes locked to ask the user whether to retain the recording selection;

receiving a response from the user that indicates whether the user desires to retain the recording selection; and unlocking the selected program and directing the video recorder to record the selected program when the response received from the user indicates that the user desires to retain the recording selection.

5. The method defined in claim 4 wherein locking the selected program comprises allowing the user to set blocking criteria.

6. The method defined in claim 5 wherein the blocking criteria is selected from the group consisting of program titles, ratings, channel numbers, time periods, content, and any combination thereof.

7. An interactive program guide system including user equipment with which an interactive television program guide is provided and which includes a video recorder and a television, comprising:

communications circuitry configured to receive television program guide information for use in the interactive television program guide;

display circuitry configured to display the interactive television program guide;

control circuitry configured to (1) provide a user with an opportunity to select a program for recording from the interactive television program guide, (2) provide the user with an opportunity to lock the selected program, wherein when the user locks the selected program, access to the selected program is blocked, (3) direct the display circuitry to display a message when the selected program becomes locked to ask the user whether to retain the recording selection, (4) process a user response that indicates whether the user desires to retain the recording selection, and (5) unlock the selected program and direct the video recorder to record the selected program when the response received from the user indicates that the user desires to retain the recording selection.

8. The interactive program guide system defined in claim 7 wherein the control circuitry provides the user with the opportunity to lock the selected program based on blocking criteria.

9. The interactive program guide system defined in claim 8 wherein the blocking criteria is selected from the group consisting of program titles, ratings, channel numbers, time periods, content, and any combination thereof.

10. A machine-readable medium for implementing an interactive television program guide comprising machine program logic recorded thereon for:

receiving television program guide information for use in an interactive television program guide;

providing a user with an opportunity to select a program for recording from the interactive television program guide;

locking the selected program, wherein when the selected program becomes locked, access to the selected program is blocked;

displaying a message when the selected program becomes locked to ask the user whether to retain the recording selection;

receiving a response from the user that indicates whether the user desires to retain the recording selection; and unlocking the selected program and directing a video recorder to record the selected program when the response received from the user indicates that the user desires to retain the recording selection.

11. The machine-readable medium defined in claim 10 further comprising machine program logic recorded thereon for locking the selected program wherein the locking the selected program comprises allowing the user to set blocking criteria.

12. The machine-readable medium defined in claim 11 further comprising machine program logic recorded thereon for allowing the user to set blocking criteria wherein the blocking criteria is selected from the group consisting of program titles, ratings, channel numbers, time periods, content, and any combination thereof.

13. An interactive program guide system including user equipment with which an interactive television program guide is provided and which includes a video recorder and a television, comprising:

means for receiving television program guide information for use in the interactive television program guide;

means for selecting a program for recording from the interactive television program guide;

means for determining whether a user is interested in locking programs;

means for displaying a message when the user is interested in locking programs and a program has been selected for recording, asking the user whether to override program locks during the recording;

means for receiving a response from the user that indicates whether the user desires to override program locks during the recording; and means for unlocking the selected program if it is locked and directing the video recorder to record the selected program when the response received from the user indicates that the user desires to override program locks during the recording.

14. The interactive program guide system defined in claim 13 wherein the means for determining whether a user is interested in locking programs comprises means for determining whether a parental control number has been created.

15. A method for using an interactive program guide system using user equipment with which an interactive television program guide is provided and which includes a video recorder and a television, comprising:
- receiving television program guide information for use in the interactive television program guide;
- selecting a program for recording from the interactive television program guide;
- determining whether a user is interested in locking programs;
- displaying a message when the user is interested in locking programs and a program has been selected for recording, asking the user whether to override program locks during the recording;
- receiving a response from the user that indicates whether the user desires to override program locks during the recording; and
- unlocking the selected program if it is locked and directing the video recorder to record the selected program when the response received from the user indicates that the user desires to override program locks during the recording.

16. The method defined in claim 15 wherein the determining whether a user is interested in locking programs comprises determining whether a parental control number has been created.

17. An interactive program guide system including user equipment with which an interactive television program guide is provided and which includes a video recorder and a television, comprising:
- communications circuitry configured to receive television program guide information for use in the interactive television program guide;
- control circuitry configured to (1) provide a user with an opportunity to select a program for recording from the interactive television program guide, (2) determine whether a user is interested in locking programs, (3) direct display circuitry to display a message when the user is interested in locking programs and a program has been selected for recording, asking the user whether to override program locks during the recording, (4) process a user response that indicates whether the user desires to override program locks during the recording, and (5) unlock the selected program if it is locked and direct a video recorder to record the selected program when the response from the user indicates that the user desires to override program locks during the recording.

18. The interactive program guide system defined in claim 17 wherein the control circuitry determines whether a user is interested in locking programs by determining whether a parental control number has been created.

19. A machine-readable medium for implementing an interactive television program guide comprising machine program logic recorded thereon for:
- receiving television program guide information for use in the interactive television program guide;
- providing a user with an opportunity to select a program for recording from the interactive television program guide;
- determining whether a user is interested in locking programs;
- displaying a message when the user is interested in locking programs and a program has been selected for recording, asking the user whether to override program locks during the recording;
- receiving a response from the user that indicates whether the user desires to override program locks during the recording; and
- unlocking the selected program if it is locked and directing a video recorder to record the selected program when the response received from the user indicates that the user desires to override program locks during the recording.

20. The machine-readable medium defined in claim 19 further comprising machine program logic recorded thereon for determining whether a user is interested in locking programs by determining whether a parental control number has been created.

* * * * *